United States Patent [19]

Bowman et al.

[11] Patent Number: 5,180,074

[45] Date of Patent: Jan. 19, 1993

[54] FLOOR BOX

[75] Inventors: Timothy S. Bowman; Heidi W. Nufer, both of Parkersburg, W. Va.

[73] Assignee: Butler Manufacturing Company, Kansas City, Mo.

[21] Appl. No.: 683,480

[22] Filed: Apr. 9, 1991

Related U.S. Application Data

[63] Continuation of Ser. No. 537,825, Jun. 14, 1990, abandoned.

[51] Int. Cl.⁵ .............................................. H02G 3/00
[52] U.S. Cl. ...................................... 220/3.8; 220/3.9; 220/3.3
[58] Field of Search ............... 220/3.3, 3.8, 3.9, 306, 220/324

[56] References Cited

U.S. PATENT DOCUMENTS

| Re. 17,222 | 2/1929 | Newman et al. | 220/3.9 |
|---|---|---|---|
| 672,368 | 4/1901 | Holshuh | 220/3.9 X |
| 691,874 | 1/1902 | Robinson | 220/3.9 |
| 782,417 | 2/1905 | Robb | 220/324 X |
| 1,239,223 | 9/1917 | Ross | 220/306 |
| 2,510,745 | 6/1950 | Kilgore | 220/3.8 X |
| 3,784,042 | 1/1974 | Hadfield et al. | 220/3.3 |
| 4,438,859 | 3/1984 | Solek | 220/3.3 X |
| 4,697,044 | 9/1987 | Ishikawa | 220/3.8 X |

Primary Examiner—Steven M. Pollard
Attorney, Agent, or Firm—McAndrews, Held & Malloy, Ltd.

[57] ABSTRACT

A floor box having structure which eliminates screws for holding the cover assembly on the box, the structure permitting the box and the cover assembly to be shipped in a disconnected condition and arranged, after the box is set up for the concrete pour, to be quickly and easily snapped into and maintained in closure position.

7 Claims, 3 Drawing Sheets

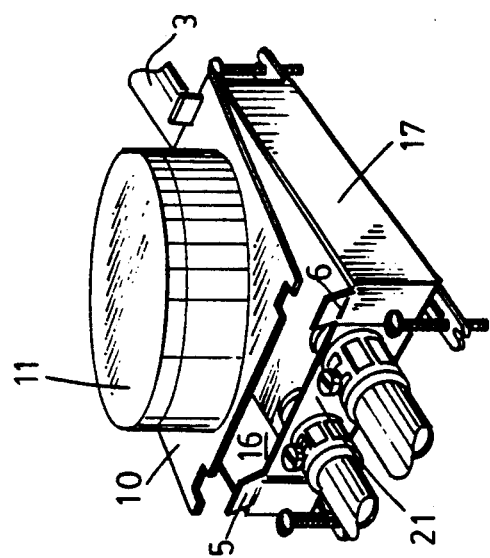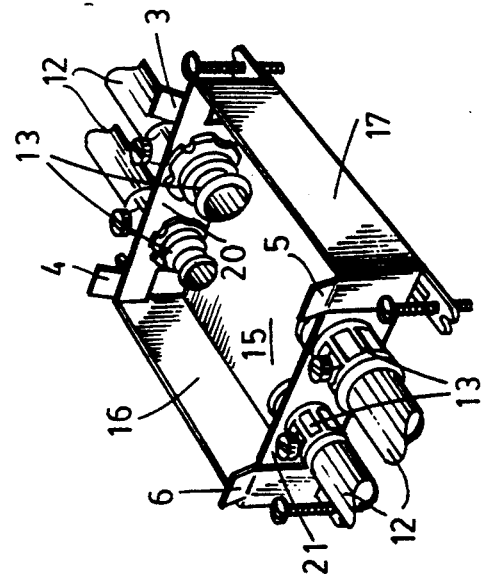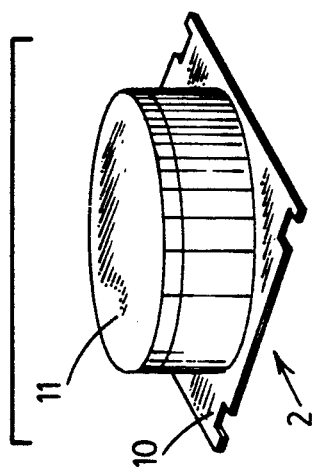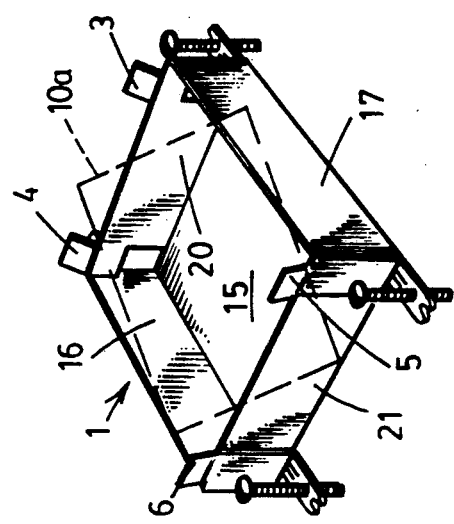

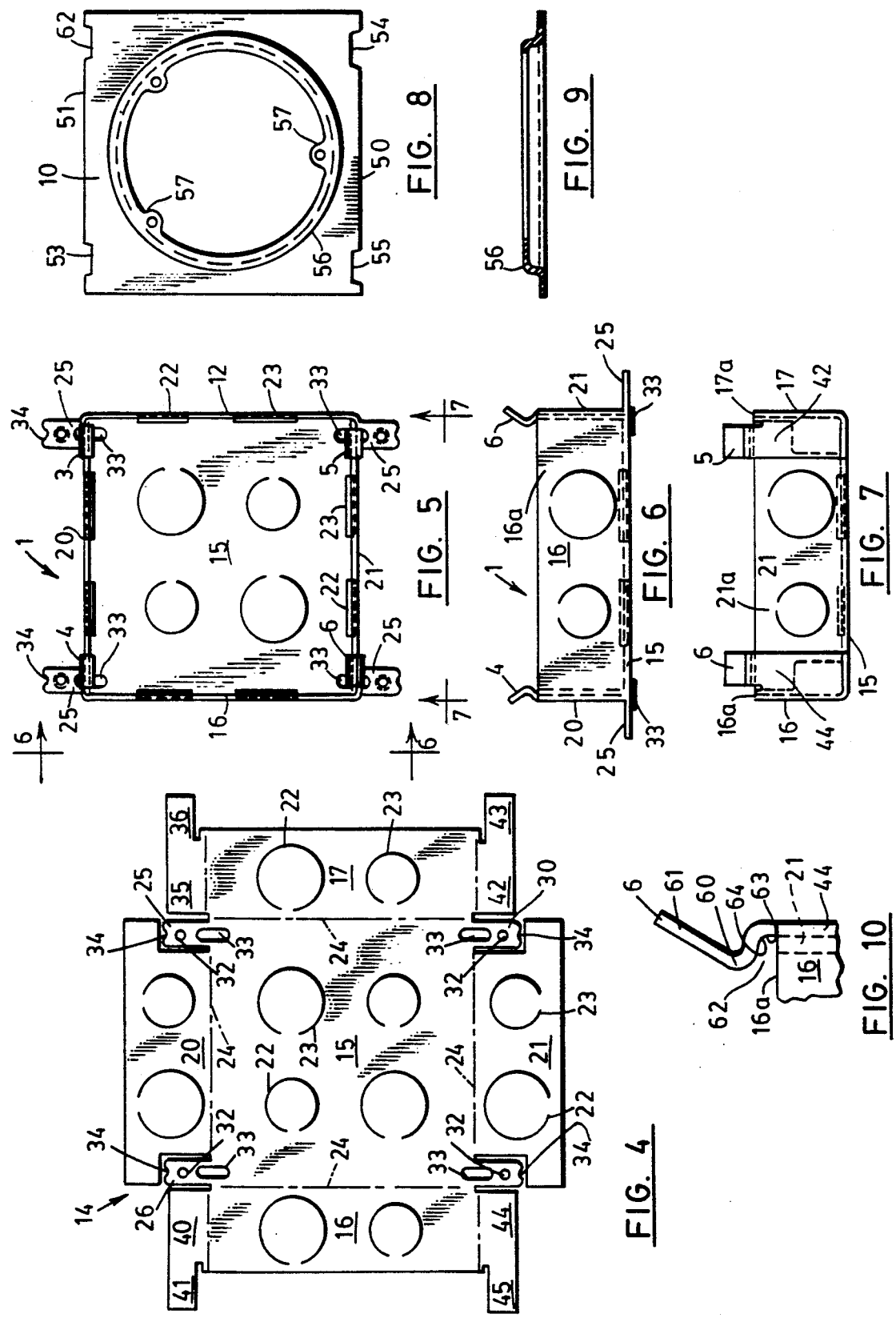

FLOOR BOX

This application is a continuation of application Ser. No. 07/537,825, filed Jun. 14, 1990, abandoned. This invention, in general, relates to underfloor or infloor electrical distribution systems and in particular relates to an improved floor box for use in such systems.

More specifically, the invention relates to improvements in floor boxes of the kind which comprises a box and a cover assembly, the box having knockouts for conduit connection and being hollow or having an open interior to pass conductors and to receive a receptacle body and the cover assembly including a cover plate which carries activation means for the box.

One object of the invention is to provide a floor box comprising a hollow box and a cover assembly wherein the cover assembly is fixed to the box in a closure condition without the use of screws.

Another object of the invention is to provide structure for a floor box of the kind in question which eliminates screws for holding the cover assembly on the box, the structure permitting the box and the cover assembly to be shipped in a disconnected condition and arranged, after the box is set up for the concrete pour, to be quickly and easily snapped into and maintained in closure position.

In one aspect the invention contemplates an improved floor box of the kind in question wherein the floor box has yieldable fingers which extend above the top of the box and are configured to permit the cover assembly to be snapped into and maintained in closure position.

In another aspect the invention contemplates an improved floor box of the kind in question wherein the cover assembly has yieldable, detented means which extend down over the side wall of the box to interengage with detent means on the side wall, the yieldable means providing for the cover assembly to be snapped into closure position and the detent means maintaining the assembly in the closure position.

The invention will be described below in connection with the following drawings wherein:

FIG. 1 is an exploded perspective view of the box and cover assembly;

FIG. 2 is a perspective view of the box with conduit secured in place;

FIG. 3 in perspective view of the box and cover assembly wherein the cover assembly is about to be placed down on the box in closure position;

FIG. 4 is a plan view of the blank layout;

FIG. 5 is a plan view of the box;

FIG. 6 is a side elevational view looking toward the right or along the lines 6—6 in FIG. 5;

FIG. 7 is a side elevational view looking upwards or along the lines 7—7 in FIG. 5;

FIG. 8 is a plan view of a cover plate employed in the cover assembly;

FIG. 9 is a side elevational view looking toward the left in FIG. 8;

FIG. 10 is an elevational view illustrating a yieldable holddown finger; and

Figure 13:
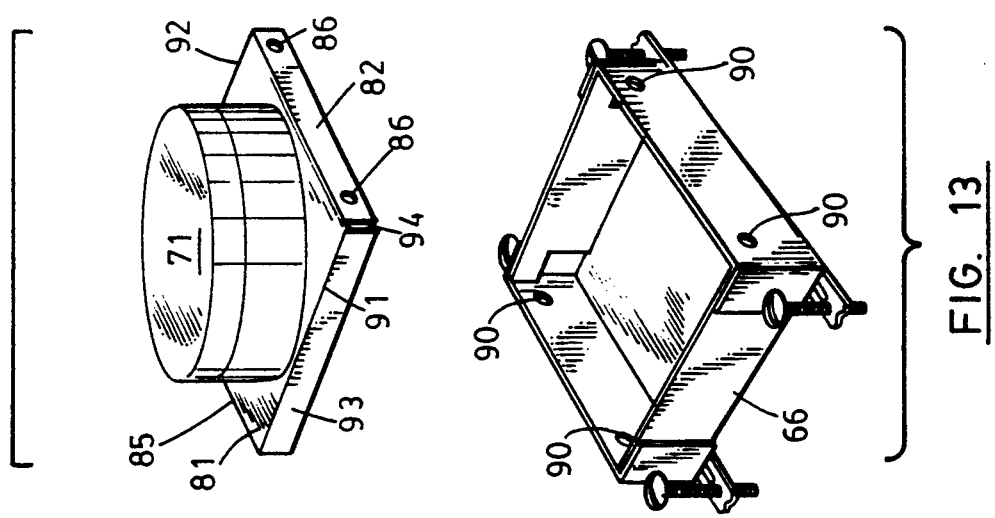
Figure 12:
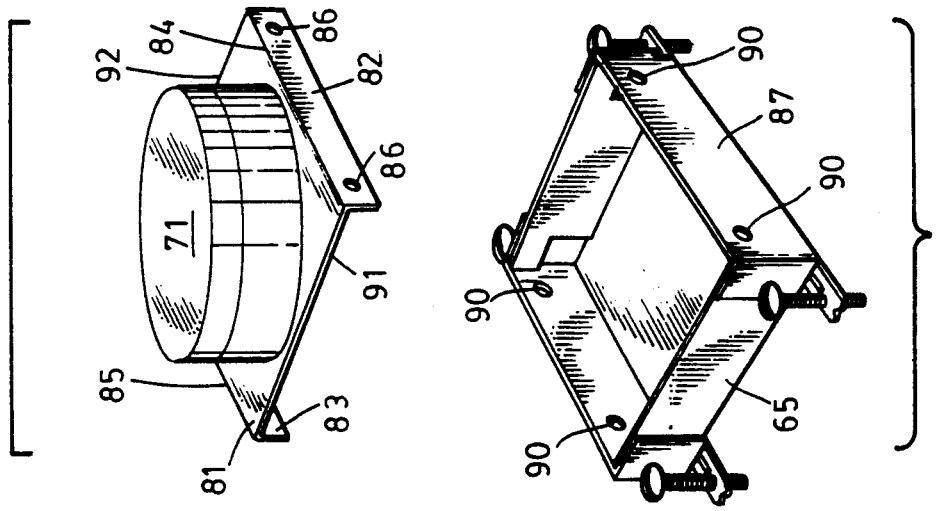
Figure 11:
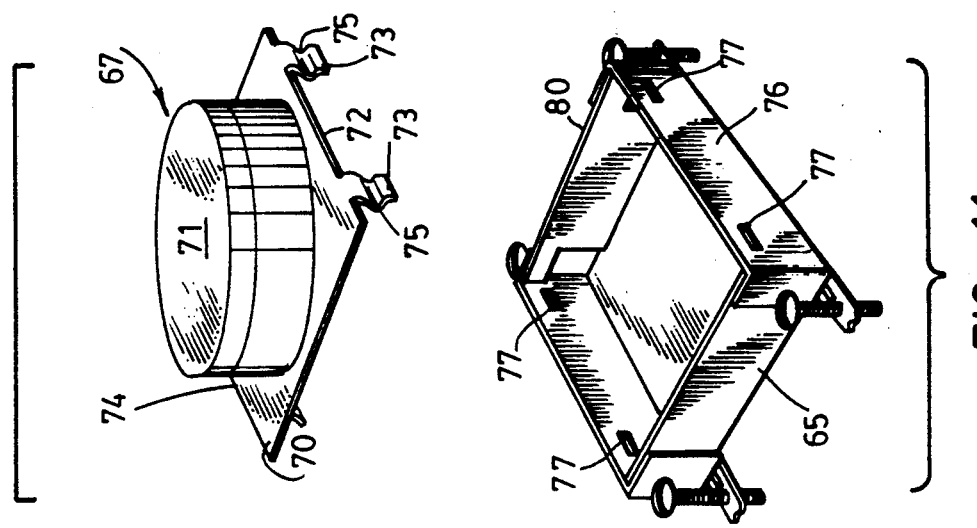

FIGS. 11, 12, and 13 are exploded, perspective views of alternative designs.

The box shown in FIGS. 1-3 and 5-7 is fabricated by feeding galvanized strip into a multi-stage progressive die which forms all parts of the box except threads for leveling screws.

FIG. 1, 2, and 3 are illustrative of typical shipping and installation aspects of on design of the floor box of the invention. In these Figures, the knockouts on the bottom and side wall of the box are not shown. These are illustrated in FIGS. 4-7.

FIG. 1, shows the general shape of the box 1 and cover assembly 2. The box is hollow and rectangular and has yieldable holddown fingers including the pair 3 and 4 and pair 5 and 6. The assembly 2 comprises the rectangular shaped cover plate 10 and cylindrically shaped housing 11 inside of which are activation means. For shipping purposes, the assembly 2 may be placed on the box with the cover plate 10 in the position of the dotted lines 10a and with the housing 11 inside the box and the two components secured with removable tape. Alternatively, the two components can be packaged separately in the same container. In either case holddown screws are not employed.

The box is connected in the distribution system by removing the appropriate knockouts and installing conduit and conduit connectors such as illustrated by conduit 12 and connectors 13. The box is then leveled on the concrete subfloor or wooden form and the cover assembly 2 installed. The assembly in set up as shown in FIG. 3 with the cover plate 10 engaging the pair of fingers 3 and 4 (or pairs 5 and 6). The assembly then rotated downwardly so the cover plate engages the fingers 5 and 6 which yield and the cover plate snaps into closure position on the box. The fingers maintain the closure position.

It will be apparent that screws are not used to secure the box and cover assembly together either in the shipping or the installation condition. This has the great advantage of saving labor time and eliminates tapped lugs on the box.

Variations of the details of the box 1 and the assembly 2 will now be described. First we will comment on the preferred shape of a blank from which the box is formed.

Referring to FIG. 4, the flat blank 14 has a bottom section 15, side sections 16 and 17 and side sections 20 and 21. The bottom and side sections are each provided with a pair of large and small knockouts as indicated at 22 and 23.

The bend lines between the bottom section and the respective side section are indicated by the dotted lines 24.

The side sections 16, 17, 20, and 21 are bent around the bend lines 24 so that they extend upwardly and normal to the bottom section 15 as indicated in FIG. 5, 6, and 7. The bottom and side sections form a hollow or open interior box. When the side sections 20, 21, 22, and 23 are bend into the position of FIG. 5-7, they form a rectangular shaped side wall and the top edges of sections terminate in cover mounting edges 16a, 17a, 20a, and 21a. These edges are coplanar and collectively form a cover mounting edge.

In forming the sides 20 and 21, the material for the side 20 is punched out to form fingers 25 and 26 and the material for the side 21 is punched out to form the fingers 30 and 31. Each of the fingers is punched out to form aperture 32 which will be tapped to receive leveling screws after the box is completely formed. Also, the material for the bottom section 15 and each of the fingers is upset to create strengthening dimples or bosses 33. Additionally, the outer edge of each finger is punched out with a small recess as indicated at 34.

These are to receive holding nails when the box is mounted on a wooden form.

When the side sections 20 and 21 are bent, the material for the feet 25, 26, 30 and 31 remains coplanar with the bottom section 15 and as indicated in FIGS. 5 and 6 extend outwardly from the bottom. In forming the sides 16 and 17, the material is punched to create at each corner an overlap section and a finger section. At the four corner, these sections are respectively indicated at 35-36, 40-41, 42-43, and 44-45.

Prior to bending the sides 17 and 18, the finger sections 36, 41, 43, and 45 are formed into a reverse bend shape as particularly noted in FIG. 10. At the time of bending the side sections 20 and 21 the overlap sections 35, 40, 42, and 44 are bent around the bend lines 46 so that they respectively engage the side section 20 and 21. This is bent indicated in FIG. 7 where the overlap sections 42 and 44 engage the side section 21.

As will be apparent from the foregoing description, that the finger section 36, 41, 43, and 44 are respectively formed into the fingers 3, 4, 5, and 6. The fingers will be commented on in more detail shortly.

As previously indicated the strip material for the box 1 is processed in a progressive die. With each die stroke, a box is ejected which is finished except for tapping the apertures 32 in the feet 25, 26, 30, and 31 for the leveling screws. After a box is ejected the same is transferred to a press and set up so that the four fingers are simultaneously tapped. The box is now ready for shipment.

Referring now to FIG. 8 and 9 we will now comment on the cover plate 10 of the cover assembly 2. The cover plate 10 is stamped out in a progressive die. Along edges 50 and 51 of the cover plate are notches 52-53 and 54-55. These notches respectively cooperate with the fingers 3, 4, 5, and 6 and will be noted shortly. Naturally, the notches 52-53 are part of the edge 51 and he notches 54-55 are part of the edge 50.

The cover plate has an internal annular lip 56 which has tapped lugs 57 to receive the adjusting screws of the activation means. The housing 11 fits down over the lip 56.

Referring back to FIG. 10, we will now comment on the shape of the holddown fingers. The fragmentary view of FIG. 10 is for the finger 6. The other fingers 3, 4, and 5 have identical structures. The finger 6 has a reverse bend section 60, a lead-in section 61 and a keeper section 62 formed by abutment 63 and 64. The keeper section 62 faces the interior of the box. The reverse-bend section 60 extends into the interior of the box and the lead-in section 61 is flared outwardly. The keeper section 62 is adapted to receive the notch 55 or 52. When the notch 55 or 62 is in the keeper section 62, the edge of the notch engages the abutment 63 and the top surface of the cover plate adjacent the notch engages the abutment 64. These notches prevent the cover assembly from shifting laterally on the box. Also, with the notch arrangement the outside dimensions of the cover plate can be larger than the outside dimensions of the box so that there is a small overhang on the cover plate. This helps to keep concrete out of the interior of the box.

It will be evident from the foregoing description that the structure permits modifications. For example, one pair of the fingers can be formed without the lead-in section and with a partial reverse-bend. The fingers then serve as abutment means to retain one edge of the assembly while the same is being snapped past the two fingers on the opposite side to the closure position.

Also, the notches in the cover plate can be eliminated particularly for installations where the box is rarely contacted after installation and before the pour.

In FIGS. 11, 12, and 13 we have illustrated alternative designs to provide the snap-in and holddown features of the invention.

The box 65 shown in FIGS. 11 and 12 and the box 6 shown in FIG. 13 have the same structure as the box 1 except the fingers 3-6 are eliminated and also the side walls of the boxes are provided with detent means. The cover assemblies may also be the same as previously described except that the cover plates are provided with yieldable means having detent means. The boxes and cover plates may be fabricated in a progressive die.

The design of FIG. 10 contemplates a plurality of detented fingers on the cover plate and corresponding detents on the side wall of the box.

Thus, the cover assembly 67 has cover plate 70 and housing 71. The edge 72 of the cover plate has a pair of yieldable fingers 73. The edge 74 has similar fingers not shown. Each finger 73 has a projecting detent 75 in the form of a bent-out section. The detent may be a projecting dimple on a flat finger.

The side wall 76 of the box has detent means 77 each in the form of a cavity dimensioned for receiving the detents 75. The cavity may be in the form of a thru-slot (as shown) or an indented dimple.

The box and cover plate are dimensioned so that the assembly can be positioned over the box and pushed down with the fingers engaging and sliding along the outside of side wall 76 until the cover plate 70 engages the cover mounting edge 80 and the detents 75 interengage with or snap into the detents 77. The cover assembly 67 is now held in closure position.

The floor box of FIG. 11 can be arranged for shipment by turning the assembly 67 upside down and placing the housing 71 inside the box or by packaging the components independently.

The design of FIG. 12 is similar to the design of FIG. 11, the difference being that the yieldable means on the cover plate comprises skirt means rather than fingers.

The cover plate 81 has a pair of depending skirts 82 and 83 extending away from the opposite sides or edges 84 and 85 of the cover plate. The skirts 82 and 83 are provided with detent means in the form of inwardly detented dimples such as the dimples 86 of the skirt 82.

The side wall 87 has detent means 90 each in the form of a cavity for receiving the detent means 86. The cavity may be in the form of a hole or an indented dimple.

The skirts 82 and 83 function and the detent means 86/90 the same as the fingers 73 and detent means 75/77.

The cover plate 81 is dimensioned so that the sides or edges 91 and 92 overhang the side wall 87 of the box.

The design of FIG. 13, except for additional skirt material, is identical to the design of FIG. 12 and the same numerals for corresponding parts have been applied. The additional skirts depend from sides or edges 91 and 92 as shown for the 93.

In this design the ends of adjacent skirts are not fixedly joined together. There is a slight separation as indicated at 94. This allows the skirt 82 and 83 with the detent means to yield.

We claim:

1. An improved floor box for use as part of an infloor electrical power distribution system in a poured concrete floor, which floor box is assembled with other electrical distribution system components, on a subfloor prior to the pouring of the concrete floor and is, after the concrete pour, closely encased in the poured concrete floor, the floor box comprising:

- a box and a cover for fitting on and use with the box; the box including a bottom wall and side walls, with the bottom wall having perimeter edges and with the side walls having first end edges that are connected with the perimeter edges of the bottom wall and second end edges that are spaced from the bottom wall, with the bottom wall and side walls defining a predetermined interior volume with the second end edges of the side walls defining an opening for the interior volume, and with the opening having a particular shape;
- means adapted for connecting the ends of electric circuit to at least one of the side walls so that the electrical conduit communicates with the interior volume and the floor box is thus connected with the infloor electrical distribution system;
- means adapted for leveling the bottom wall with respect to the sub-floor, the leveling means being affixed to the box and adapted to position the box so that the bottom wall is generally horizontal at a preselected location above the subfloor and the side walls extend upwardly from the bottom away from the subfloor so as to position the opening opposite the subfloor;
- said leveling means comprising four leveling screw mounting feet, said feet being integral with the bottom and extending outwardly therefrom and each foot being formed with a strength bending boss and also formed with adjusting screw mounting threads;
- the cover having a shape that is congruent to the particular shape of the opening and sized so that it closes the opening when the cover is fitted on the box;
- means for holding the cover down and fitted on the box and for assuring that the cover will prevent concrete from entering the interior volume during the concrete pour, the hold down means constructed for snap-in engagement of the cover and the box upon application of a force urging the cover into relation with the box that closes the opening; and
- wherein the holddown means includes a plurality of yieldable fingers having an abutment section extending inwardly with respect to the interior volume, to overlie the plane of the sidewalls and having a lead-in section extending outwardly from an inner extent of the abutment section away from the interior volume and beyond the side wall
- whereby the cover is secured to the box by pressing the cover against the box to engage the snap-in hold down means so as to seal the box before concrete is poured to form the floor around the in-floor distribution system and the floor box.

2. The improved floor box of claim 1 wherein the cover includes a normally closed activation opening and means for mounting an activation housing that is adapted to the activation opening and the activation mounting means and to extend from the cover outwardly from the box.

3. The improved floor box of claim 2 wherein the snap-in hold down means extend upwardly from the second end edges of the side walls.

4. The floor box of claim 2 wherein the box includes first and second side walls separated from each other, the cover includes first and second edges that are positioned adjacent to the first and second side walls of the box when the cover closes the opening of the box, and the snap-in hold down means includes a finger extending from the first edge and a finger extending from the second edge of the cover along the adjacent side walls of the box, each finger having a detent that extends into a cavity formed in the side wall of the box adjacent to the finger whereby the cover is secured to the box by the cooperation of the detents and the cavities.

5. The floor box of claim 4 wherein the cavities in the sides of the box are indented dimples.

6. The floor box of claim 4 wherein the cavities are thru-slots.

7. The floor box of claim 4 wherein the fingers extend along the edges of the cover forming a skirt and include a second detent that extends into a second cavity in the adjacent side at a location separated from the detent and cavity along the edge of the cover.

* * * * *